(12) United States Patent
Ragner

(10) Patent No.: US 10,850,382 B1
(45) Date of Patent: Dec. 1, 2020

(54) DRIVE PLIERS

(71) Applicant: Gary Dean Ragner, Gainesville, FL (US)

(72) Inventor: Gary Dean Ragner, Gainesville, FL (US)

( * ) Notice: Subject to any disclaimer, the term of this patent is extended or adjusted under 35 U.S.C. 154(b) by 334 days.

(21) Appl. No.: 16/120,257

(22) Filed: Sep. 1, 2018

(51) Int. Cl.
| | |
|---|---|
| *B25F 1/00* | (2006.01) |
| *B25F 1/04* | (2006.01) |
| *B25B 7/22* | (2006.01) |
| *B25G 1/08* | (2006.01) |
| *B43K 23/00* | (2006.01) |
| *B43K 29/18* | (2006.01) |
| *B43K 29/00* | (2006.01) |
| *B43K 29/02* | (2006.01) |
| *B43L 19/00* | (2006.01) |
| *B23D 29/02* | (2006.01) |
| *B43K 19/00* | (2006.01) |

(52) U.S. Cl.
CPC ............. *B25F 1/003* (2013.01); *B25B 7/22* (2013.01); *B25F 1/04* (2013.01); *B25G 1/085* (2013.01); *B43K 23/00* (2013.01); *B43K 29/004* (2013.01); *B43K 29/18* (2013.01); *B23D 29/023* (2013.01); *B43K 19/00* (2013.01); *B43K 29/02* (2013.01); *B43L 19/0056* (2013.01)

(58) Field of Classification Search
CPC ... B25F 1/003; B25F 1/04; B25B 7/22; B25G 1/085; B43K 23/00; B43K 29/004; B43K 29/18; B43K 29/02; B43K 19/00; B23D 29/023; B43L 19/0056
See application file for complete search history.

(56) References Cited

U.S. PATENT DOCUMENTS

| | | |
|---|---|---|
| 4,744,272 A | 5/1988 | Leatherman |
| 4,987,626 A | 1/1991 | Montgomery |
| 5,245,721 A | 9/1993 | Lowe |
| 6,643,877 B1 | 11/2003 | Amtenbrink |
| 7,845,254 B2 | 9/2010 | Lionel |
| 8,376,199 B2 * | 2/2013 | Ellis ........................ B25F 1/003 224/163 |
| 2003/0154552 A1 * | 8/2003 | Oka ......................... B25B 7/22 7/127 |
| 2019/0291256 A1 * | 9/2019 | Baronti .................. B25G 1/085 |

\* cited by examiner

*Primary Examiner* — David B. Thomas

(57) ABSTRACT

A collapsible dual screwdriver assembly pliers or drive-pliers for short, comprises a pliers and two screwdriver assemblies, where the screwdriver assemblies are individually removably attachable in a stowed position and an extended position. In the stowed position each screwdriver assembly can provide compact storage of the tool as well as function as a portion of a handle for the other screwdriver assembly. In the extended position each screwdriver assembly can be used as an extended handle for the pliers, as well as, function as a multi-bit screwdriver individually.

12 Claims, 5 Drawing Sheets

Figure 2:
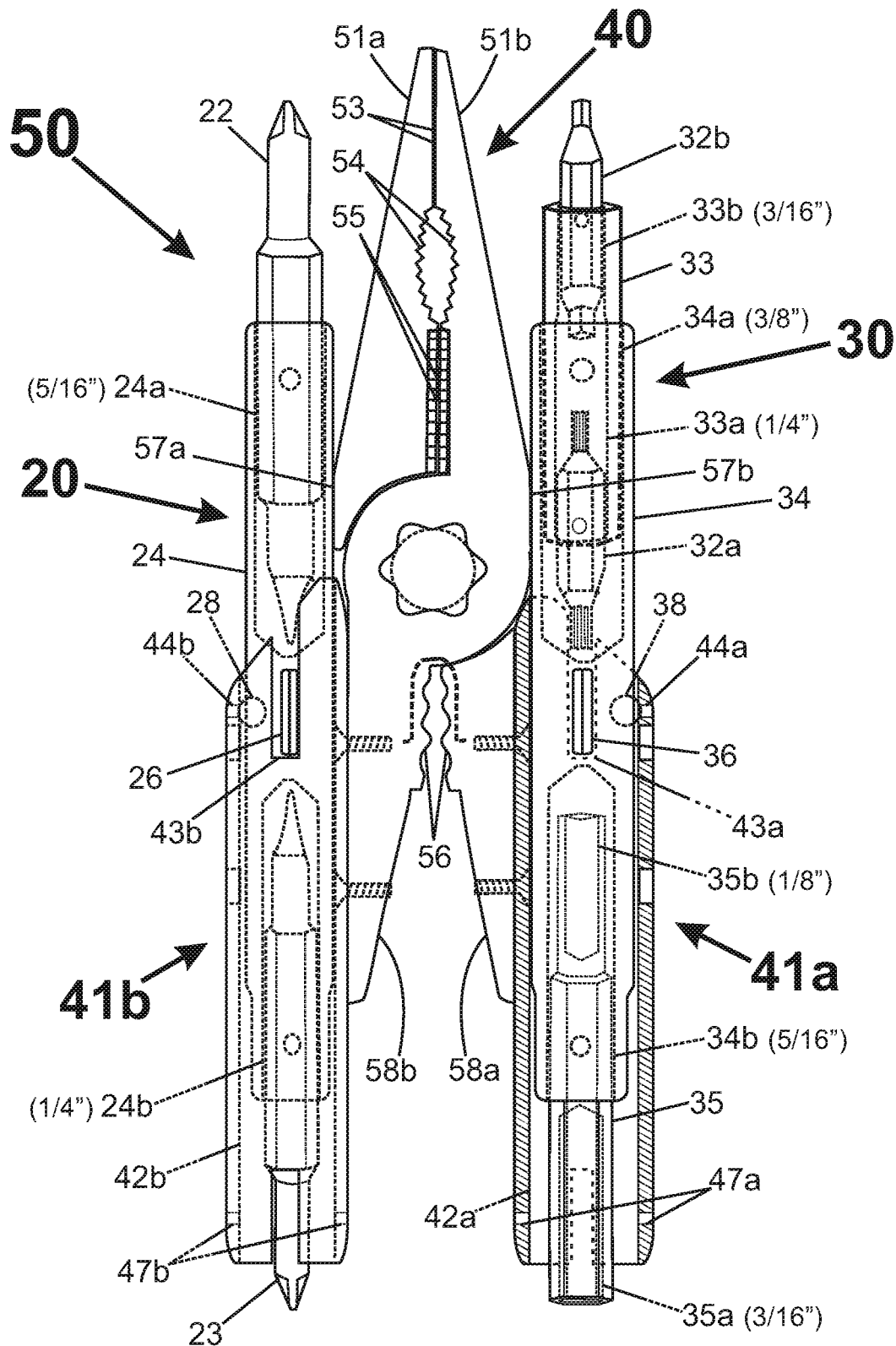

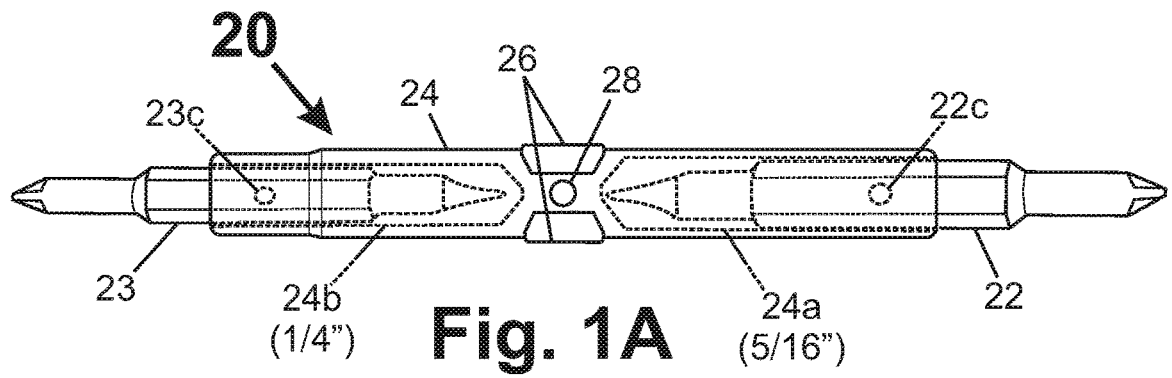
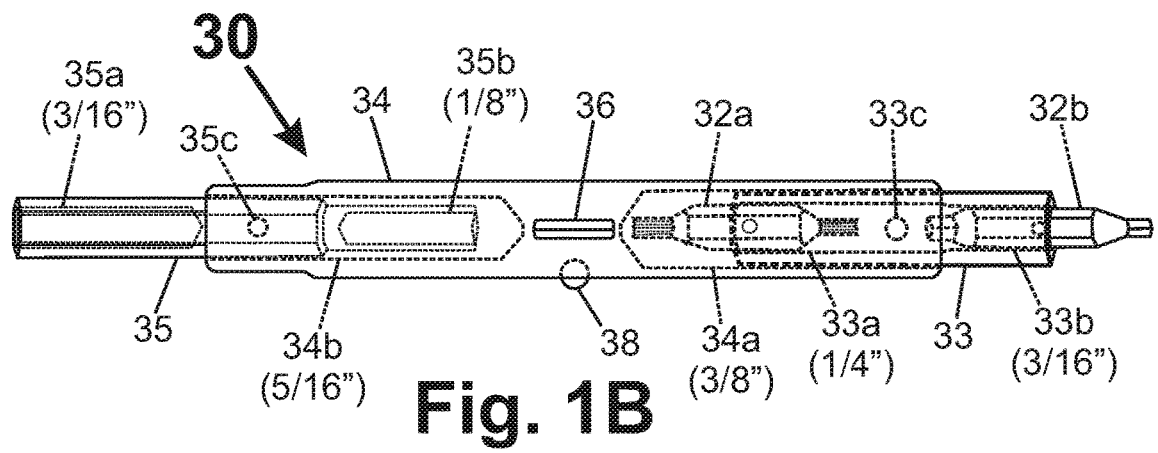
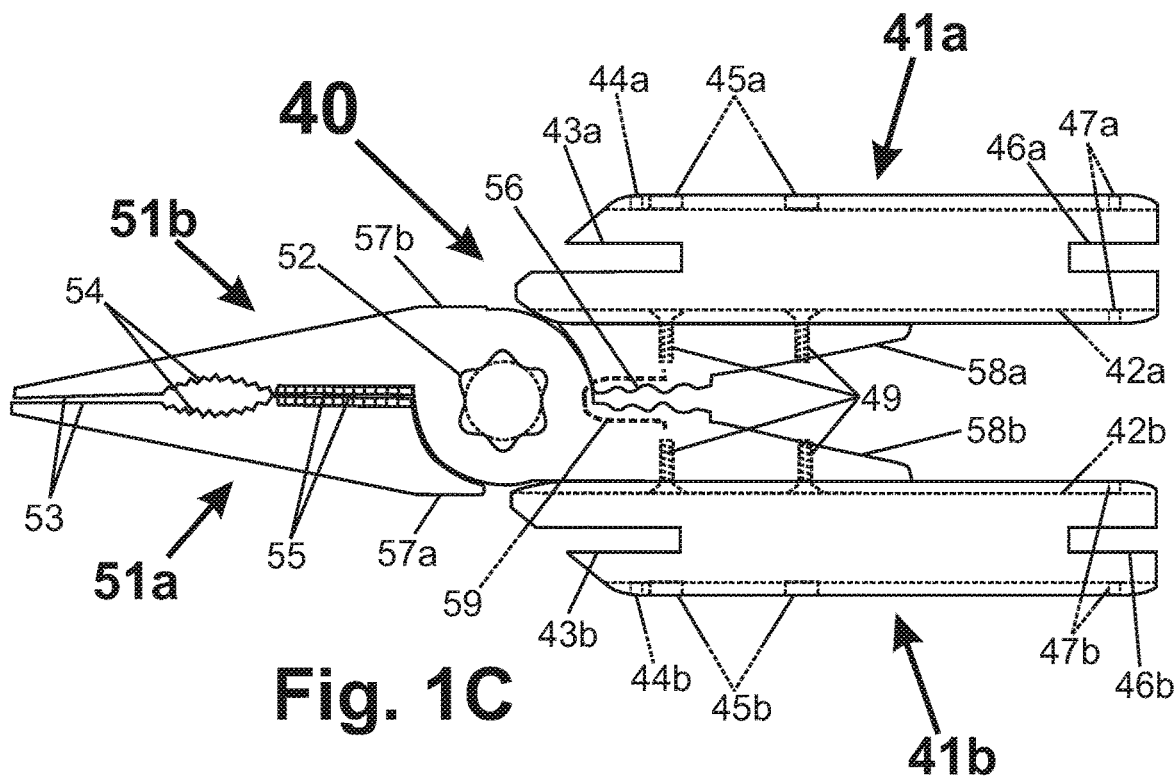

DRIVE PLIERS

CROSS-REFERENCE TO RELATED APPLICATIONS

This utility application claims priority from U.S. Provisional application Ser. No. 62/553,825, filed on Sep. 1, 2017, titled: "DRIVE PLIERS" to the Applicant is hereby incorporated by reference in its entirety, including any figures, tables, equations or drawings.

BACKGROUND OF INVENTION

The field of this invention relates to hand tools that comprise both pliers and screwdrivers in a single compact tool, and more specifically to pliers with two dual-position screwdriver assemblies that function as the handles for the pliers in one position and a compact stowed state in a second position.

The present state of the art for hand tools is very diverse. Pliers and screwdrivers are sometime combined but generally the screwdrivers are undersized and generally hard to use because of their construction. The disclosed pliers design comprises two screwdriver assemblies that act as the pliers' handles in an extended position and alternately as screwdrivers. Each screwdriver assembly can have multiple screwdriver bits ends and tools for various rotary fasteners.

Most American homes have at least one pair of pliers and at least one screwdriver in their home. The disclosed dual screwdriver assembly pliers or "drive-pliers" for short, uses movable screwdriver assemblies as the arms for the pliers and also as part of the handle when using one of the screwdriver assemblies. The screwdriver assemblies are movable to a stow position to make the pliers more compact for storage. Each screwdriver assembly can comprise multiple screwdriver bits that are easily accessed and used by a user.

The disclosed invention comprises a pliers (needle nose pliers, channel lock pliers, adjustable pliers, etc.) and a full set of screwdriver bits in one tool. Other plier jaw times are easily adapted to this design and the screwdriver bits can be customized by the user to contain the screwdriver bits and tools they most often use. This can significantly reduce the overall stowed size for the user while keeping the same functionality. The screwdriver bits are housed in various style screwdriver assemblies that can be configured as needed by the user needs. The screwdriver assemblies do quadruple duty as the handles for the pliers in their extended position, as a screwdriver shank when one screwdriver assembly is extended, as a portion of the screwdriver handle when one screwdriver assembly is in its stowed position, and as a stowed and compact state when both screwdriver assemblies are in their stowed position.

SUMMARY

The disclosed double-screwdriver assembly pliers or multi-tool combine a pair of plier jaws with two or more screwdriver assemblies. Each screwdriver assembly can comprise two or more screwdriver bits ends. Each screwdriver assembly can also function as a handle for the pliers when in an extended position. Each screwdriver assembly can also be moved to a stowed position to make the multi-tool more compact for storage. Each screwdriver assemblies can alternately be place in its extended position for use as a screwdriver. Because of the way the disclosed multi-tool is constructed, the user is provided with a gripping handle that is wide compared to other screwdriver handles and thus allows the user to provide a very large torque to the screwdriver bit or socket driver if needed. Sixteen screwdriver bits can easily be incorporated in to the two screwdriver assemblies and several hex-head nut driver sizes can also be included. Some of these screwdriver bits can be replaced with other tools such as hole punches, marking scribes, a writing pen or pencil, socket adaptor and other tools that will fit in the end of one or more of the screwdriver assemblies.

OBJECTIVES AND ADVANTAGES

Accordingly, many unique structures and advantages of my invention comprise:
a) To provide a compact dual-screwdriver assembly pliers (drive-pliers) that combines a pliers with a full set of screwdriver tool bits.
b) To provide a collapsible drive-pliers multitool that combines a pliers with a full set of screwdriver tool bits. Where the screwdriver assemblies act as the handles for the pliers during use.
c) To provide a collapsible drive-pliers multitool that combines a pliers with a full set of screwdriver tool bits. Where the screwdriver assemblies act as the handles for the pliers during use, and where the screwdriver assemblies can be moved to a stowed position substantially adjacent the pliers' head when not in use.
d) To provide a collapsible drive-pliers multitool with eight or more screwdriver bits and/or types of driver bits that are easily accessible to the user.
e) To provide a collapsible drive-pliers multitool that combines a pliers with a full set of screwdriver tool bits. Where the screwdriver assemblies act as the handles for the pliers during use and can be completely removed from the pliers for use.
f) To provide a collapsible drive-pliers multitool that combines a pliers with a full set of screwdriver tool bits. Where the screwdriver assemblies comprises other narrow tools other than screwdriver bits (e.g., knives, pry tools, flashlights, pencils, pens, wood or metal files, various fishing tools, scribing tools, center punches, etc.).
g) To provide a collapsible drive-pliers multitool that combines a pliers with four or more tool bits. Where the pliers can comprise nearly any pliers or scissors head.
h) To provide a protective cover or cap for the pinching surfaces on a pliers head during use as a screwdriver handle.

DRAWING FIGURES

Figure 3:
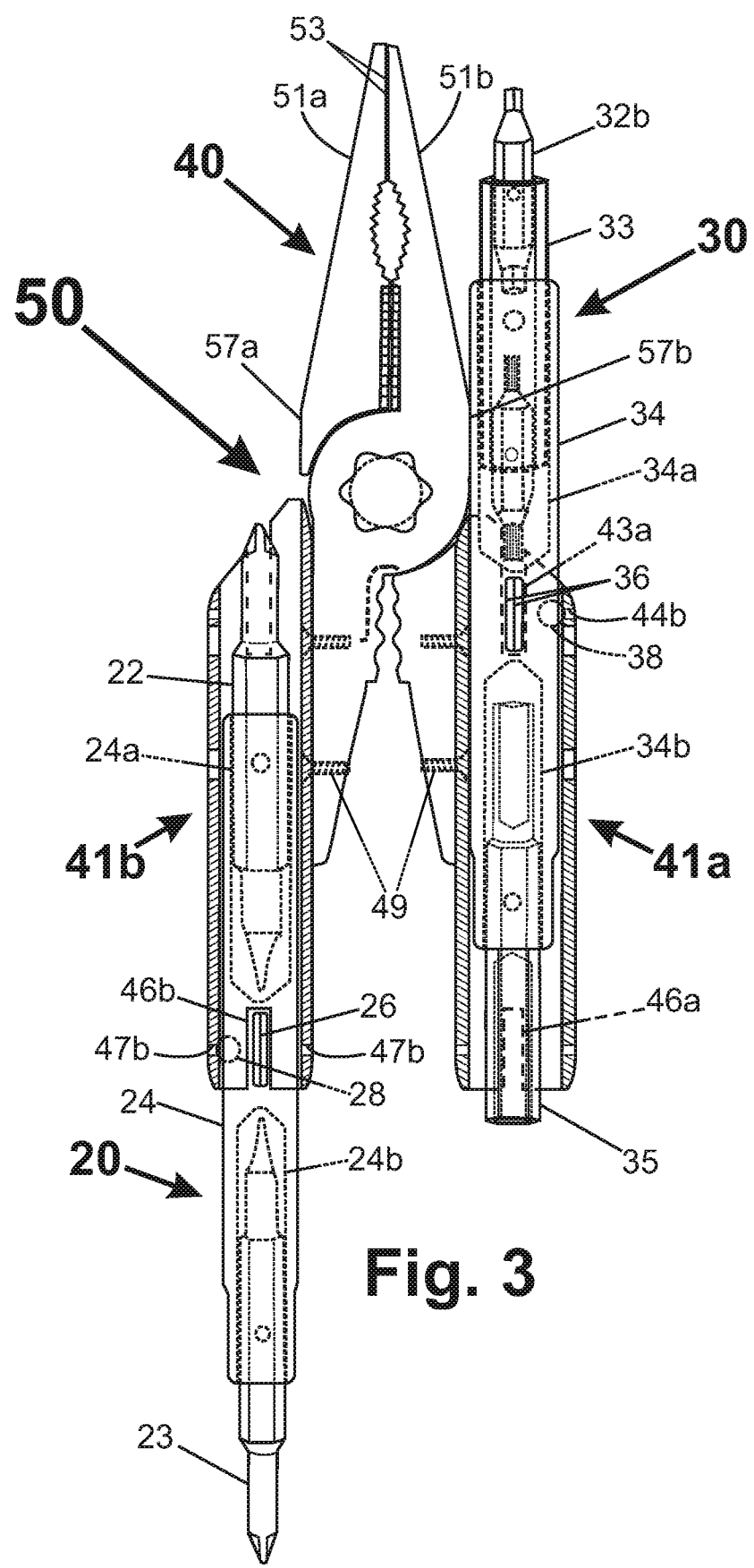
Figure 4A:
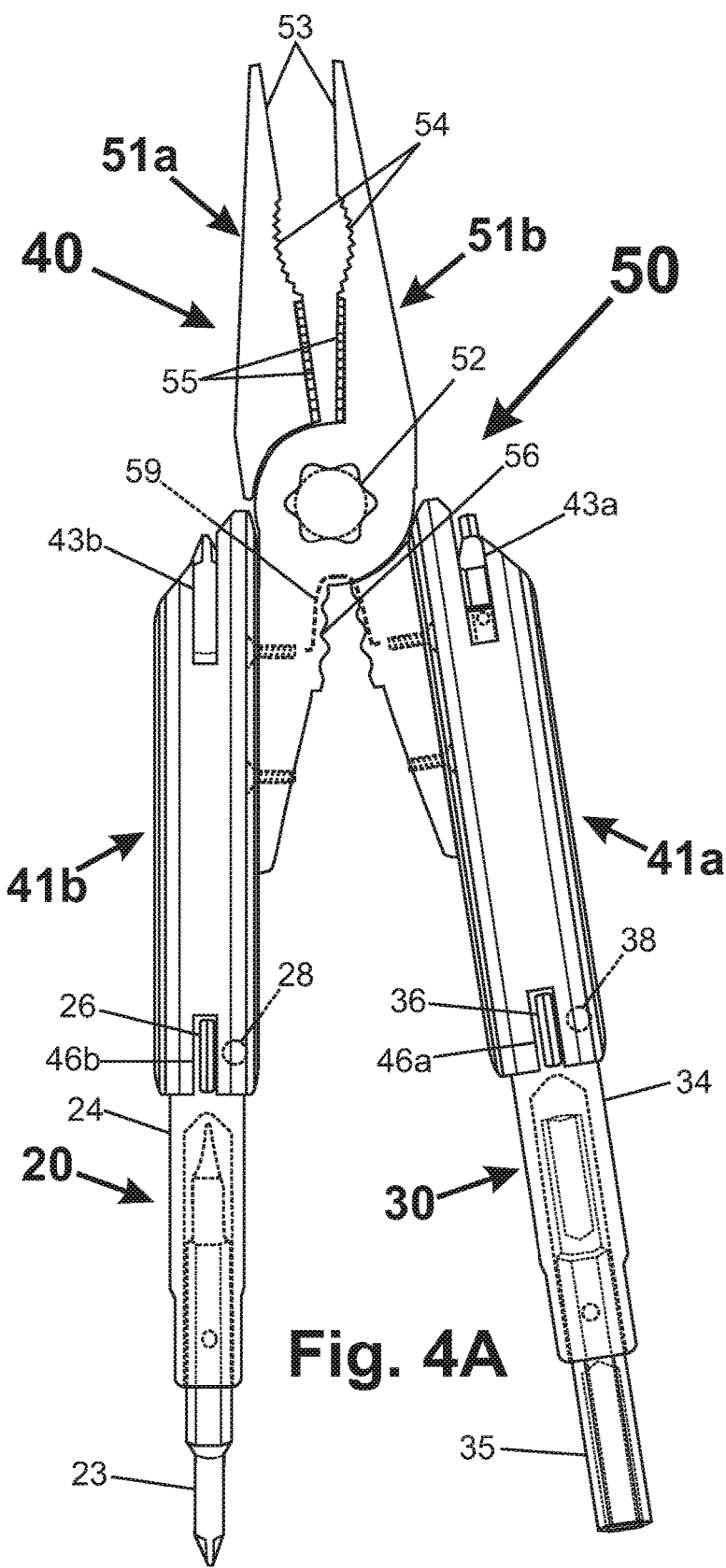

FIG. 1A Prior Art—Double-ended screwdriver assembly
FIG. 1B Prior Art—Double-ended screwdriver assembly
FIG. 1C Pliers with dual screwdriver assembly attachments
FIG. 2 Pliers with dual screwdriver assembly attachments (screwdriver assemblies installed in their stowed position)
FIG. 3 Pliers with screwdriver assembly receivers (screwdriver assembly 20 positioned for use as a Philips screwdriver.
FIG. 4A Pliers with dual screwdriver assembly attachments (screwdriver assemblies positioned for use as a pliers)
FIG. 4B Prior art screwdriver assembly with pencil and eraser designed to securely fit in one end of the screwdriver assembly.

Figure 5:
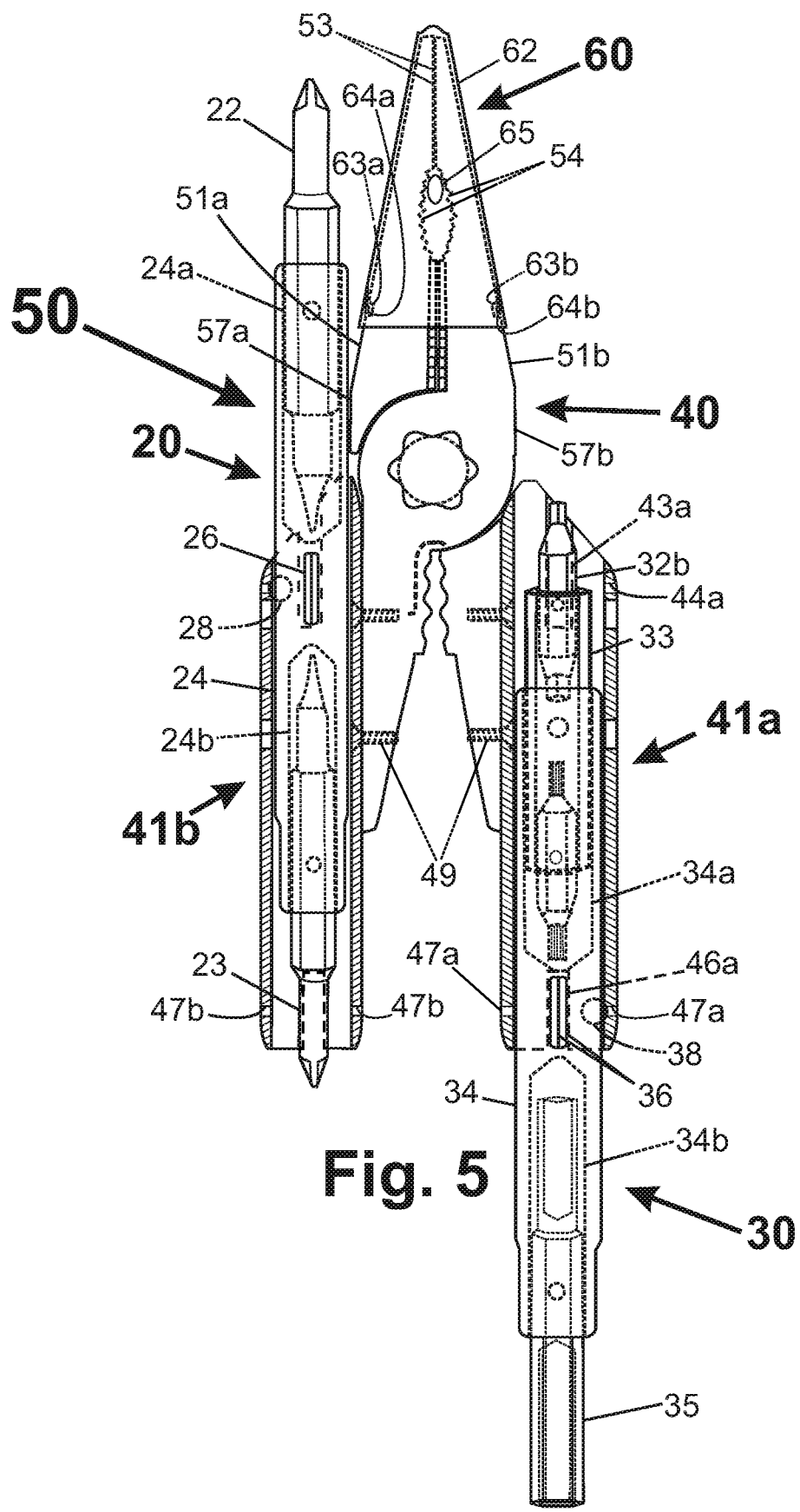

FIG. 5 Pliers with screwdriver assembly receivers (screwdriver assembly 30 positioned for use as a nut driver) and a protective cap 60 over the working end of needle nose pliers 40.

| DRAWING REFERENCE NUMBERS - DRIVE PLIERS | | | |
|---|---|---|---|
| 20 | Prior Art - Dual-Ended Screwdriver Assembly 1 | 20a | Screwdriver Assembly 1 with Pencil |
| 22 | Prior Art - Double-ended screwdriver bit | 22c | Spring-loaded ball bearing |
| 23 | Double-ended screwdriver | 23c | Spring-loaded ball bearing |
| 24 | Central Housing | | |
| 24a | Socket cavity (5/16") | 24b | Socket cavity (1/4") |
| 26 | Locking tabs | 28 | Spring-loaded ball bearing |
| 29 | Pencil | 29a | Pencil eraser |
| 29b | pencil lead | 29c | Retaining cuff |
| 30 | Prior Art - Dual-Ended Screwdriver Assembly 2 | | |
| 32a | Double-ended screwdriver bit | 32b | Double-ended screwdriver bit |
| 33 | Inner housing | 33a | Socket cavity (1/4") |
| 33b | Socket cavity (3/16") | 33c | Spring-loaded ball bearing |
| 34 | Central Housing | | |
| 34a | Socket cavity (3/8") | 34b | Socket cavity (5/16") |
| 35 | Double-ended socket | 35a | Socket cavity (3/16") |
| 35b | Socket cavity (1/8") | 35c | Spring-loaded ball bearing |
| 36 | Locking tabs | 38 | Spring-loaded ball bearing |
| 40 | Needle nose pliers | | |
| 41a | Upper receiver | 41b | Lower receiver |
| 42a | Upper receiver channel | 42b | Lower receiver channel |
| 43a-b | Front slots | 44a-b | Front securing holes |
| 45a-b | Access holes | | |
| 46a-b | Rear slots | 47a-b | Rear securing holes |
| 49 | Mounting Screws | | |
| 50 | Dual-Screwdriver assembly Pliers (drive-pliers) | | |
| 51a | Lower plier jaw | 51b | Upper plier jaw |
| 52 | Plier hinge | | |
| 53 | Needle nose pliers gripping surfaces | 54 | Scalloped pliers gripping surfaces |
| 55 | Wire cutting plier edges | 56 | Crimper pliers gripping surfaces |
| 57a | Outside surface on lower jaw 51a | 57b | Outside surface on upper jaw 51b |
| 58a | Plier attachment arm (lower jaw) | 58b | Plier attachment arm (upper jaw) |
| 59 | Spring clip | | |
| 60 | Protective Cap | 62 | Protective Cover Body |
| 63a | Lower hole or notch | 63b | Upper hole or notch |
| 64a | Lower holding latch | 64b | Upper holding latch |
| 65 | Friction tab | | |

DETAILED DESCRIPTION OF THE INVENTION

The disclosed dual screwdriver assembly pliers (drive-pliers) is shown herein with a needle nose pliers, but most other pliers styles can also be used. Lineman pliers, raptor pliers, high-leverage pliers, fencing pliers (includes hammer head), carpenter's pliers, long reach pliers, locking pliers (i.e., Vise Grip®), and duck-bill pliers are examples of just a few styles of pliers that can be used with the disclosed drive-pliers. Construction of the drive-pliers would generally comprise a hardened metal or metal alloy such as high carbon steel, chrome vanadium steel, stainless steel, titanium, aluminum alloy, nickel alloys, cobalt alloys, etc. The materials used to make the disclosed drive-pliers are not limited to metals, and other materials like reinforced plastics and composite materials also can be used depending on the tool use. The standard manufacturing methods of drop forging and machining, machining, injection molding, extrusion, laminating, etc., can be used here to manufacture the disclosed drive-pliers. Chrome vanadium steel is popular for wrenches, ratchets, hammers, screwdrivers, and other hand tools because of its combination of relatively inexpensive cost, high strength, and good corrosion resistance. Chrome vanadium steel is a good choice of material for the pliers head and/or screwdriver assemblies and bits for the above reasons. Standard tool manufacturing techniques can be used to construct the disclosed pliers and screwdriver tools. Hinge construction on these drive-pliers can comprise nearly any hinge structure that can support the torques and loads that will be applied to pliers during use. The pliers' hinge axis can be oriented substantially perpendicular to the screwdrivers' and socket drivers' axes so that the pliers' hinge does not tend to rotate when the user applies torque to use the screwdrivers or sockets. The pliers' hinge does not need to provide a locking mechanism in order for the user to transfer torque through the hinge to the screwdrivers or sockets and ultimately to a rotary fastener. The pliers' jaws can be held closed by side pressure from either screwdriver assembly so that the user can grip the pliers' jaws without being pinched when using the pliers' jaws as a handle when turning a rotary fastener with one of the screwdriver assemblies. The edges of the pliers' jaws gripping surfaces can also be rounded to further reduce the chance of pinching.

FIG. 1A depicts a typical prior art double-ended screwdriver assembly 20 comprising a central housing 24 and two double-ended screwdriver bits 22 and 23. Central housing 24 can comprise a 5/16 inch socket cavity 24a, a 1/4 inch socket cavity 24b, a pair of locking tabs 26 and a spring-loaded ball bearing 28. Socket cavities 24a and 24b are defined on opposite ends of central housing 24 and designed to grip and hold either end of double-ended screwdriver bits 22 and 23 respectively. Locking tabs 26 are designed to engage a receiver so that rotational torque can be transferred to double-ended screwdriver assembly 20. Spring-loaded ball bearing 28 makes friction contact with this same receiver to hold double-ended screwdriver assembly 20 in place during use and storage. Socket cavities 24a-b can be designed to drive hex-head rotary fasteners (e.g., bolts, nuts, screws, etc.) as shown or other fastener heads designs, such as: 1) four-point standard (square shape), 2) six-point standard (hexagon shape), 3) twelve-point standard (double hexagon), 4) twelve-point spline, 5) lobed gripping surfaces (both six and twelve point), 6) saw toothed surfaces, 7) asymmetric gripping surfaces, 8) variations on these basic shapes and 9) many other shape specialty shapes for various purposes. This list of rotary fastener heads is not exhaustive and many other gripping surface designs exist in the prior art that can be used with the disclosed sockets within the screwdriver assemblies. If other more exotic socket gripping surfaces are used for socket cavities 24a-b, the cross-sectional shape of double-ended screwdriver bits 22 and 23 might need to be modified from their present hexagonal (six-sided) shape to fit properly within these differently shaped socket cavities. Reshaping double-ended screwdriver bits 22 and 23 and socket cavities 24a-b to the appropriate shape can easily be done by someone skilled in the art of tool making.

In FIG. 1A, double-ended screwdriver bits 22 and 23 are shown with a hexagonal middle section for fitting into socket cavities 24a-b respectively. The hexagonal shape shown allows torque to be applied from central housing 24 to double-ended screwdriver bits 22 and 23. The screwdriver bits and socket cavities can have other cross-sectional shapes besides hexagonal as desired to provide the desired tool functions. Double-ended screwdriver bits 22 and 23 can each have a Philips head end and a flat head end. The bit sizes on double-ended screwdriver bit 22 can be large than the bit sizes on double-ended screwdriver bit 23 to provide four different screwdriver bits for double-ended screwdriver assembly 20. Double-ended screwdriver bit 22 and 23 can each comprise a spring-loaded ball bearing 22c and 23c respectively so that these ball bearings create friction against socket cavities 24a and 24b respectively to hold the screwdriver bits in place during use and storage. In alternate designs, spring-loaded ball bearings 22c and 23c can be replaced with magnets or spring clips on double-ended screwdriver bits 22 and 23 and/or separate spring clips on central housing 24.

FIG. 1B depicts a double-ended screwdriver assembly 30 comprising a central housing 34, an inner housing 33, a double-ended socket 35 and two double ended screwdriver bits 32a and 32b. Central housing 34 can be constructed similar to central housing 24, but with different socket cavity sizes to provide more functionality for the disclosed dual screwdriver assembly pliers 50 (see FIGS. 2, 3 and 4A). Central housing 34 can comprise a ⅜ inch socket cavity 34a, a 5/16 inch socket cavity 34b, a pair of locking tabs 36 and a spring-loaded ball bearing 38. Socket cavities 34a and 34b are defined on opposite ends of central housing 34 and can be designed to grip and hold double-ended screwdriver bits 32a and 32b respectively. Socket cavities 34a and 34b are also designed to grip one or more styles of rotary fastener heads. Locking tabs 36 are designed to engage a receiver so that rotational torque can be transferred to double-ended screwdriver assembly 30. Spring-loaded ball bearing 38 makes friction contact with this same receiver to hold double-ended screwdriver assembly 30 in place during use and storage. Socket cavities 34a-b can be designed to drive hex-head rotary fasteners (e.g., bolts, nuts, screws, etc.), but can easily be changed to grip other types of rotary fasteners. If other more exotic-shaped gripping surfaces are used for socket cavities 34a-b, the cross-sectional shape of double-ended socket driver 35 and inner housing 33 might need to be modified from their present hexagonal (six-sided) shape to fit properly within these exotic-shaped socket cavities. Socket cavities 34a-b along with the center portion of double-ended screwdriver bits 32a-b and double-ended socket driver 35 can be reshaped to allow socket cavities 34a-b to be used for turning nearly any types of rotary fastener.

In FIG. 1B, inner housing 33 comprises two socket cavities 33a-b one on each end and a spring-loaded ball bearing 33c near its middle. Double-ended inner housing 33 can be constructed similar to central housing 34. Spring-loaded ball bearing 33c is designed to create friction against socket cavity 34a to hold inner housing 33 in place within socket cavity 34a during use and storage. Socket cavities 33a-b are designed to receive and hold either end of double-ended screwdriver bits 32a-b respectively. Double-ended screwdriver bits 32a-b can be replaced with alternate bit ends depending on the user's needs. Dozens of different bit styles are available in the prior art and more are likely to be created in the future, each of these different style bit ends can be used with inner housing 33. Double-ended screwdriver bits 32a-b are reversible in socket cavities 33a-b respectively and inner housing 33 is reversible within socket cavity 34a. This double reversibility allow all four ends of double-ended screwdriver bits 32a-b, as well as, socket cavities 33a-b to be used. Further, double-ended inner housing 33 and double-ended socket 35 can be removed so that socket cavities 34a and 34b respectively can also be used to turn appropriately sized rotary fasteners. Double-ended socket 35 comprises a 3/16 inch socket cavity 35a, a ⅛ inch socket cavity 35b and a spring-loaded ball bearing 35c. Double-ended socket 35 is reversibly in socket cavity 34b to allow either socket cavity 35a or 35b to be alternately used. In alternate designs, spring-loaded ball bearings 33c and 35c can be replaced with magnets or spring clips on inner housing 33 and double-ended socket 35 and/or on central housing 34. Similarly, the holding friction created by the spring-loaded ball bearings shown on double-ended screwdriver bits 32a-b (ball bearings not labeled) can be replaced with magnets or spring clips on double-ended screwdriver bits 32a-b and/or double-ended inner housing 33.

FIG. 1C depicts a needle nose pliers 40 comprising an upper receiver 41a, a lower receiver 41b, a lower plier jaw 51a, an upper plier jaw 51b, a plier hinge 52, a spring clip 59 and four screws 49. Upper and lower plier jaws 51a-b each comprise a needle nose pliers gripping surface 53, a scalloped pliers gripping surface 54, a wire cutting plier edges 55, a crimper pliers gripping surface 56 and two plier attachment arms 58a-b respectively. Four screws 49 are used to hold upper and lower receivers 41a-b to plier attachment arms 58a-b respectively. Upper and lower plier jaws 51a-b can be integrated with upper and lower receivers 41a-b respectively to form single components or can be combined by welding them together. Upper and lower receivers 41a-b can act as short handles for needle nose pliers 40 to get into tight places. Upper and lower plier jaws 51a-b are pivotally connected at plier hinge 52 and each comprise a needle nose pliers gripping surface 53, a scalloped pliers gripping surface 54, a wire cutting plier edges 55, a crimper pliers gripping surface 56, an outside surfaces 57a-b respectively and a plier attachment arms 58a-b respectively. Upper receiver 41a can comprise an upper receiver channel 42a, a pair of front slots 43a, a front securing hole 44a, a pair of access holes 45a, a pair of rear slots 46a and a pair of rear securing holes 47a. Both ends of upper receiver channel 42a can be designed to receive and hold either end of double-ended screwdriver assembly 30. Double-ended screwdriver assembly 30 can be inserted into the front end of upper receiver 41a with locking tabs 36 engaging front slots 43a and spring-loaded ball bearing 38 engaging front securing hole 44a to hold double-ended screwdriver assembly 30 in upper receiver channel 42a for storage. Either end of double-ended screwdriver assembly 30 can be inserted into the rear end of upper receiver 41a with locking tabs 36 engaging rear slots 46a and spring-loaded ball bearing 38 can engage either securing hole 47a to hold double-ended screwdriver assembly 30 in upper receiver channel 42a for use. Similarly, lower receiver 41b can comprise a lower receiver channel 42b, a pair of front slots 43b, a front securing hole 44b, a pair of access holes 45b, a pair of rear slots 46b and a pair of rear securing holes 47b. Both ends of lower receiver channel 42b can be designed to receive and hold either end of double-ended screwdriver assembly 20. Double-ended screwdriver assembly 20 can be inserted into the front-end of lower receiver 41b with locking tabs 26 engaging front slots 43b and spring-loaded ball bearing 28 engaging front securing hole 44b to hold double-ended screwdriver assembly 20 in lower receiver channel 42b for storage. Either end of double-ended screwdriver assembly 20 can be inserted into the rear end of lower receiver 41b with locking tabs 26 engaging rear slots 46b and spring-loaded ball bearing 28 engaging either of the rear securing holes 47b to hold double-ended screwdriver assembly 20 in lower receiver channel 42b for use. Four screws 49 are used to hold upper and lower receivers 41a-b in place on plier attachment arms 58a-b respectively. Plier attachment arms 58a-b can be integrated with upper and lower plier jaws 51a-b respectively and generally made of a single piece of forged steel. In alternate designs, upper and lower receivers 41a-b can be welded to plier attachment arms 58a-b respectively to permanently secure them together. Outside surfaces 57a-b provide a contact surface for double-ended screwdriver assemblies 20 and 30 to press against when inserted in upper and lower receivers 41a-b respectively. This pressure against outside surfaces 57a-b tend to keep upper and lower plier jaws 51a-b closed which means potential pinching by pliers gripping surfaces 53, 54 and 56, and wire cutting plier edges 55 tend to be pressed closed. The result is that the user is much less likely to be pinched by upper and lower plier jaws 51a-b when using them as a screwdriver handle (see FIG. 3). In alternate designs, other tools can be provided for upper and lower plier jaws 51a-b that are common in pliers, such as, wire strippers, wire bending tools, various crimpers, scissors, specialty plier heads, etc.

FIG. 2 depicts a dual-screwdriver assembly pliers 50 (drive-pliers) comprising needle nose pliers 40 and two screwdriver assemblies 20 and 30. Drive-pliers 50 is shown here in its stowed position with double-ended screwdriver assembly 30 inserted in upper receiver 41a and double-ended screwdriver assembly 20 inserted in lower receiver 41b. The length of drive-pliers 50 when in this stowed position is approximately the same as the length of double-ended screwdriver assemblies 20 and 30 and needle nose pliers 40 by themselves. This provides a relatively compact and flat drive-pliers. Upper receiver 41a is shown in cross-section to provide a better view of how spring-loaded ball bearing 38 interacts with front securing hole 44a. Either end of double-ended screwdriver assemblies 20 and 30 can be inserted into the front ends of receivers 41b and 41a respectively, since locking tabs 26 and 36 are substantially in the center of double-ended screwdriver assemblies 20 and 30 respectively. Spring-loaded ball bearings 28 and 38 are designed to strongly press outward away from its central housing 24 and 34 respectively. When inserted into the front end of upper receiver 41a and lower receiver 41b, spring-loaded ball bearings 38 and 28 fall into place against front securing holes 44a and 44b respectively. This engagement between ball bearing and securing holes tends to hold each screwdriver assembly securely within its respective receiver. Notice that on the front end of upper and lower receivers 41a and 41b there is only a single securing hole 44a and 44b for each respectively. In other designs two holes can be provided for the front portion of the receivers to allow the ball bearing of the screwdriver assemblies to lock in place against a securing hole no matter which direction the screwdriver assembly is inserted as can be seen in the rearward portions of upper receiver 41a and lower receiver 41b. In the rearward portions two securing holes are provided (rear securing holes 47a on upper receiver 41a and rear securing holes 47b on lower receiver 41b) so that double-ended screwdriver assemblies 30 and 20 can be inserted in either direction and have their spring-loaded ball bearing find a securing hole 47a and 47b respectively. Front and rear securing holes 44a-b and 47a-b are optional because friction between spring-loaded ball bearings 38 and 28 and receiver channels 42a-b can generate sufficient friction to hold screwdriver assemblies 30 and 20 in place during use respectively. Alternatively, a small indentation can be ground on the inside wall of receiver channels 42a-b to give spring loaded ball bearings 38 and 28 respectively something to hold onto.

In FIG. 2, notice that only a single front securing hole 44a and 44b is shown on each of the upper and lower receivers 41a and 41b respectively. This is to encourage the user to only insert double-ended screwdriver assemblies 30 and 20 in the front end of upper receiver 41a and lower receiver 41b respectively, with spring-loaded ball bearings 38 and 28 respectively facing outward. The reason for this is to use the spring force from spring-loaded ball bearings 28 and 38 to provide an inward directed force on the exposed portion of central housings 24 and 34 against the outside surfaces 57a-b on upper and lower plier jaws 51a-b respectively. This inward directed force against outside surfaces 57a-b tends to keep upper and lower plier jaws 51a-b firmly closed when needle nose pliers 40 is used as the handle for one of the screwdriver assemblies (see FIG. 3). By keeping upper and lower plier jaws 51a-b firmly closed and pressed together the chances of the user being pinched by the pliers gripping surfaces (needle nose pliers gripping surface 53, scalloped pliers gripping surfaces 54, wire cutting plier edges 55 and crimper pliers gripping surfaces 56) while using it as a handle is greatly reduced. Also, rounding the outside edges of the pliers gripping surfaces 53, 54 and 56, and wire cutting plier edges 55 can further reduce the pinching hazard.

In other alternate designs for needle nose pliers 40, upper and lower receivers 41a-b can have a C-shape so that the outer portion of the receivers is cut away to reduce the overall width of needle nose pliers 40. That is, four screws 49 would attach these modified upper and lower receivers (not shown) to plier attachment arms 58a-b respectfully near the center of these receivers' new C-shape. Doing this would cut away access holes 45a and securing holes 44a and 47a on the outer surface of upper receiver 41a. Without securing hole 44a spring-loaded ball bearings 38 would not have a surface to push against to keep upper and lower plier jaws 51a-b closed. However, spring action can easily be built into the C-shape of the receivers so that they can interact with double-ended screwdriver assemblies 20 and 30, when inserted in these C-shaped receivers, and press central housings 24 and 34 against outside surfaces 57a and 57b respectively. In fact, a more secure fit can probably be achieved this way than with spring-loaded ball bearings 28 and 38.

FIG. 3 depicts a dual-screwdriver assembly pliers 50 (drive-pliers) in one of many positions for use of a screwdriver bit or socket driver. In this particular position the Philips end of double-ended screwdriver bit 23 is ready for use with double-ended screwdriver assembly 20 inserted in the rearward portion of lower receiver 41b. Locking tabs 26 are engaged in rear slots 46b to allow torque to be applied to double-ended screwdriver assembly 20. Spring-loaded ball bearing 28 interacts with one of the rear securing holes 47b (does not matter which securing hole 47b) to prevent double-ended screwdriver assembly 20 from accidently falling out of its receiver during use. Needle nose pliers 40 and the upper portion of double-ended screwdriver assembly 30 provide a wide gripping handle for the user to apply torque to double-ended screwdriver assembly 20 and double-ended screwdriver bit 23. Note that if double-ended screwdriver bit 23 is removed, socket cavity 24b can be used to turn hex head rotary fasteners of the appropriate size (¼ inch in this example) using needle nose pliers 40 and double-ended screwdriver assembly 30 as a socket driver handle. Since both double-ended screwdriver bits 22 and 23 and central housing 24 are reversible, the user can easily switch between any end of either double-ended screwdriver bits 22 and 23 and the two socket cavities 24a and 24b. Similarly, double-ended screwdriver assembly 30 can be removed from upper receiver 41a and reinserted in the rear portion (bottom in FIG. 3) of upper receiver 41a (to the right in FIG. 3) for use. Double-ended screwdriver assembly 20 would be returned to its stowed position at the front of lower receiver 41b so that double-ended screwdriver assembly 30 can be effectively used. Central housing 34 is reversible within upper receiver 41a, inner housing 33 is reversible within socket cavity 34a, double-ended screwdriver bits 32a and 32b are each reversible within inner housing 33 and double-ended socket 35 is reversible within socket cavity 34b. The result of all these double-ended component being reversible, is that the user can select any of the tool ends within double-ended screwdriver assemblies 20 and 30 for use (also see FIGS. 1A and 1B).

In FIG. 3, central housing 34 of double-ended screwdriver assembly 30 is pressed up against outside surface 57b on lower plier jaw 51b. This pressure can come from the spring loading in spring-loaded ball bearing 38, but can be generated by the shape and structure of upper receiver 41a. In alternate designs upper and lower receivers 41a-b can be modified to provide the needed spring action to force central housings 34 and 24 against their respective outside surfaces 57b and 57a. This force (or pressure) on outside surfaces 57a-b forces upper and lower plier jaws 51a-b closed since central housing 34 of screwdriver assembly 30 is pushing plier jaw 51b in one direction while upper receiver 41a is pushing plier jaw 51a in the opposite direction. The result is that needle nose pliers gripping surfaces 53 can be pressed tightly closed when either double-ended screwdriver assembly 20 and/or double-ended screwdriver assembly 30 is inserted in its respective receiver. Thus, in this example in FIG. 3, double-ended screwdriver assembly 30 in its stowed position is forcing plier jaws 51a-b closed so they can safely be used as a gripping handle for double-ended screwdriver assembly 20.

FIG. 4A depicts a dual-screwdriver assembly pliers 50 (drive-pliers) with upper and lower plier jaws 51a-b slightly opened for use and double-ended screwdriver assemblies 20 and 30 in position and ready to use as extended handles for needle nose pliers 40. Spring clip 59 can provide the force to open upper and lower plier jaws 51a-b. Both double-ended screwdriver assemblies 20 and 30 are inserted on the rear portions of their respective lower and upper receivers 41b and 41a. Upper and lower receivers 41a and 41b are shown blocking all shadow lines except for spring-loaded ball bearings 28 and 38 to keep the drawing uncluttered for the reader. Spring-loaded ball bearings 28 and 38 are shown engaging the inside of lower and upper receivers 41b and 41a, respectively, to show that the orientation of double-ended screwdriver assemblies 20 and 30 within the rear portion of their respective receivers will work. When double-ended screwdriver assemblies 20 and 30 are inserted in the front portions of the receivers for storage, the direction of spring-loaded ball bearings 28 and 38 respectively can be important to insure that upper and lower plier arms 51a and 51b remain tightly closed to prevent pinching of the user's hand during use as a screwdriver or socket driver handle. In this configuration, double-ended screwdriver assemblies 20 and 30 act as extended handles for needle nose pliers 40, greatly increasing the leverage for the user over needle nose pliers 40 alone.

Figure 4B:
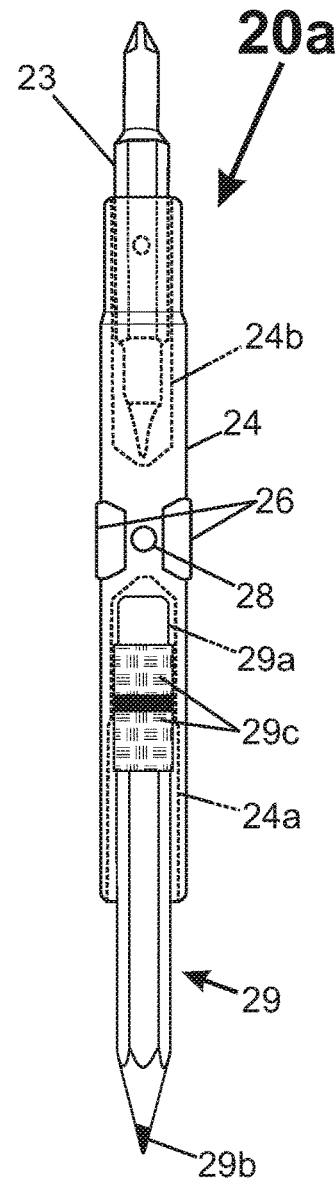

FIG. 4B depicts a double-ended screwdriver assembly 20a that is substantially the same as double-ended screwdriver assembly 20 except that double-ended screwdriver bit 23 has been replaced by pencil 29. Pencil 29 comprises a pencil eraser 29a, a pencil lead 29b and a retaining cuff 29c. Pencil eraser 29a and pencil lead 29b work substantially as a standard pencil. Retaining cuff 29c provides the standard function of holding the wood portion of pencil 29 to eraser 29b, plus providing a spring action against the interior wall of socket cavity 24b. This spring action of retaining cuff 29c allows pencil 29 to be inserted into socket cavity 24b and remain their with sufficient friction that it does not fall out during normal use, but is easily pulled free by the user for use. Note that the pencil can be used while still inserted in central housing 24 and only need be removed to use pencil eraser 29a. Note that pencil 29 could just as easily been designed to fit into one of the socket cavities (i.e., 33a-b, or 34a-b). Further, standard sized pencils and pencil eraser ends can fit snugly in a 5/16 inch socket cavity like socket cavities 24a and 34b with little or no modification. In alternate designs pencil 29 can be replaced with an ink pen, mechanical pencil or other scribing instrument.

FIG. 5 depicts the dual-screwdriver assembly pliers 50 (hereafter "drive-pliers 50") in one of its many operational positions. In this particular illustration the double-ended socket 35 is ready for use on the end of double-ended screwdriver assembly 30 inserted in the rearward portion of upper receiver 41a. During use of the disclosed drive-pliers 50 there is the potential for the users skin to get caught between gripping surfaces 53 and 54 and/or wire cutter edges 55. As previously discussed there are multiple ways to protecting the user from pinches by surfaces 53, 54 and 55. First, the gripping surfaces 53 and 54 can be rounded on their outside edges to make it more difficult for the users skin from getting down into the gap between these surfaces and get pinched. Second, the geometry of plier jaws 51a-b and their interaction with screwdriver assemblies 20 and/or 30 can provide a force tending to hold plier jaws 51a-b closed during use of one of the screwdriver assemblies 20 or 30. Third, a protective cap 60 can be used to cover the gripping surfaces 53, 54 and cutting edges 55. Needle nose pliers 40 can be modified two small holes or notches 63a-b, by drilling or machining, in the lower and upper plier jaws 51a-b respectively. These small holes or notches 63a-b are optional for holding a protective cap 60 in place over needle nose pliers 40 and other temporary holding means can be used. Protective cap 60 can comprise a cover body 62, two holding latches 64a-b and a friction tab 65. The two holding latches 64a-b are drawn in solid lines even though they appear hidden in FIG. 5 to help distinguish them from the nearby small holes or notches 63a-b with which they interact. Cover body 62 can comprise a plastic material, an elastomer or other polymer material that can cover the working end of needle nose pliers 40. The two holding latches 64a-b and friction tab 65 can be built into cover body 62 or comprise spring loaded structures to engage gripping surfaces 54 and holes or notches 63a-b respectively. Both holding latches 64a-b and friction tab 65 perform a holding function to keep protective cap 60 in place during use of screwdriver assemblies 20 and 30, while still allowing the user to remove protective cap 60 when needle nose pliers 40 is being used. The small holes or notches 63a-b can be small drill holes or machined notches in to the sides of plier jaws 51a-b respectively. The small holes or notches 63a-b can be designed to catching on holding latches 64a-b respectively. In some embodiments, friction tab 65 can comprise other removable holding means such as an indentation that grip the edges of gripping surfaces 54, or a movable pin that slides in-between gripping surfaces 54, or other holding mechanism for securing protective cap 60 to the end of needle nose pliers 40. In some embodiments, two or more holding means can be used. In some embodiments protective cap 60 can extend all the way down to upper and lower receivers 41a-b and/or can comprise a rubberized material that tends to use friction to hold protective cap 60 in place over the end of needle nose pliers 50 (i.e., holes or notches 63a-b not needed). In order to use the pliers function of drive-pliers 50, protective cap 60 can be gripped by the user and removed to expose plier jaws 51a-b for use. During the use of screwdriver assembly 20 or 30 the plier jaws 51a-b can be used as a screwdriver driver handle. With protective cap 60 installed over plier jaws 51a-b as illustrated, the user can be protect from pinching their skin between gripping surfaces 53 and 54, and wire cutter edges 55.

Operational Description (FIGS. 2, 3, 4A and 4B)

The dual-screwdriver assembly pliers (drive-pliers) provides three main novel functions: 1) provides a compact stowed arrangement to minimizes the overall size of the drive-pliers in storage, 2) allows the pliers' jaws to be used as a screwdriver handle for turning screwdriver bits within the screwdriver assemblies and 3) provide extended handles for the pliers by repositioning the two screwdriver assemblies to the rear portions of the receivers. These basic novel functions can be combined with many different additional tool function to provide a selection of tools specific to that user and their needs. For example, pencil 29 when added to double-ended screwdriver assembly 20 or 30 has its own operational modes independent of the other operations of the drive-pliers (see FIG. 4B). Further, double-ended screwdriver assembly 20 is shown with four screwdriver bit sizes and two socket driver sizes, and double-ended screwdriver assembly 30 is shown with four screwdriver bit sizes and six socket drivers (two of which are the same size in this example) and needle nose pliers 40 can also provide multiple functions by itself, and in the disclosed drive-pliers shows four functions: 1) needle nose pliers 53, 2) scalloped pliers 54, 3) wire cutter 55, and 4) crimping tool 56. If the screwdriver assemblies are modified so that each central housing end incorporates a double-ended inner housing similar to inner housing 33, then potentially sixteen different screwdriver bit sizes, and twelve different socket driver sizes can be used simply by reversing and/or removing central housings, inner housings, socket drivers and/or screwdriver bits.

Tool Operation

Though not discussed in detail here, the use of screwdrivers, socket drivers, pliers and other common hand tools are common knowledge. For use of screwdriver bits or socket driver cavities, the gripping surface of these tools can be placed in contact with the rotary fastener's head and torque can be applied to turn the fastener by the user. In the disclosed examples, the user can perform a screwdriver function by placing one of the screwdriver assemblies in the rear end of its receiver so that it extends one of the screwdriver bits or driver sockets away from the pliers' head. The other screwdriver assembly is left in the front end of its receiver so that it and needle nose pliers 40 can be used as a handle for the screwdriver assembly being used to turn the rotary fastener (see FIG. 3). Also, most people know how to generally use a pair of pliers when presented with one. Similarly, people generally know how to use a pencil as seen in FIG. 4B. Thus, only a small amount of time will be spent on the operation of the different functions that the disclosed drive-pliers can perform and I will focus more on the conversion of the drive-pliers between these functions.

1) Stowed Positions (FIG. 2)

In FIG. 2, drive-pliers 50 is shown in its stowed position. To get into this stowed position the user can slide double-ended screwdriver assemblies 20 and 30 into the forward end of their appropriate lower and upper receivers 41b and 41a respectively. The screwdriver assemblies are forced into their receiver until spring-loaded ball bearings 28 and 38 are seated in front securing holes 44b and 44a respectively. Locking tabs 26 and 36 slide into forward slots 43b and 43a respectively. The position of the receivers with respect to outside surfaces 57a-b on upper and lower plier jaws 51a-b result in central housings 24 and 34 of double-ended screwdriver assemblies 20 and 30 being forced against the outside portions of upper and lower plier jaws 51b and 51a (outside surfaces 57a-b) respectively. Spring tension in spring-loaded ball bearings 28 and 38 can provide this force against outside surfaces 57a and 57b on upper and lower plier jaws 51a and 51b respectively to keep the plier jaws closed during storage and also during use as a screwdriver handle.

2) Screwdriver Positions (FIG. 3)

In FIG. 3, drive-pliers 50 is shown in one of its many screwdriver position. Double-ended screwdriver assembly 20 has been removed from the forward end of lower receiver 41b and reinserted in the rear end of lower receiver 41b. Locking tabs 26 slide into rear slots 46b and spring-loaded ball bearing 28 clicks into place on the inner edge of one of the two rear securing holes 47b. In this position the Philips end of double-ended screwdriver bit 23 is ready for use, and needle nose pliers 40 and double-ended screwdriver assembly 30 can be used as an easy to grip screwdriver handle. Because of the wide grip of the combined needle nose pliers 40 and double-ended screwdriver assembly 30, a large amounts of torque can be generated to loosen stubborn rotary fasteners (not shown). However, after the rotary fastener is loosened, the tip of upper and lower plier jaws 51a-b can be used as a pivot point to quickly unscrew the rotary fastener the rest of the way. Double-ended screwdriver bits 22 and 23 as well as central housing 24 can be reversed to allow all the screwdriver bit ends and socket driver ends on double-ended screwdriver assembly 20 to be used. Similarly, double-ended screwdriver assembly 30 can be moved to the rear end of upper receiver 41a and double-ended screwdriver assembly 20 moved to the upper end of lower receiver 41b. By reversing the needed components all the screwdriver bit ends and driver socket ends on double-ended screwdriver assembly 30 can be used. While double-ended screwdriver assembly 30 is being used, needle nose pliers 40 and double-ended screwdriver assembly 20 could be used as a grip handle for double-ended screwdriver assembly 30. Note that upper and lower receivers 41a-b provide the widest grip and leverage for the double-ended screwdriver assemblies 20 and 30, but one screwdriver assembly is needed in its stowed position, if no other locking mechanism for upper and lower plier jaws 51a-b is used, so that upper and lower plier jaws 51a-b remain closed during use as a screwdriver handle. Because of this, one screwdriver assembly will generally be in its stowed position while the user grips not only upper and lower receivers 41a-b, but also upper and lower plier jaws 51a-b and double-ended screwdriver assembly 20 or 30 depending on which screwdriver assembly is not being used (in its stowed position). Alternatively, upper and lower plier jaws 51a-b and/or needle nose pliers 40 can comprise a locking mechanism (not shown) that are common for spring-loaded pliers.

In FIG. 3, notice that central housing 34 is forced against outside surface 57b on upper and lower plier jaw 51b by spring tension from spring-loaded ball bearing 38 as it pushes against the inside wall of upper receiver 41a. This force on outside surface 57b tends to force upper and lower plier jaws 51a-b closed and thus reduce the chances of the user getting pinched by gripping surfaces on upper and lower plier jaws 51a-b as it is being used as a screwdriver handle. To further reduce the chances of the user being pinched by needle nose pliers 40, each of the pliers gripping surfaces 53, 54 and 56, and wire cutting edges 55 (see FIG. 1A) can be beveled so that the user's skin can slide out from between these surfaces if there are slight movements of upper and lower plier jaws 51a-b.

3) Pliers Positions (FIG. 4A)

In FIG. 4A, drive-pliers 50 is shown in its pliers position and ready to be uses as a pair of needle nose pliers, scalloped pliers, wire cutter and/or crimper. Both double-ended screwdriver assemblies 20 and 30 have been inserted in the rear end of their respective receivers 41b and 41a. In this position double-ended screwdriver assemblies 20 and 30 provide extended handles for needle nose pliers 40. This gives needle nose pliers 40 good leverage when using the extended ends of double-ended screwdriver assemblies 20 and 30 as handles. Spring clip 59 tends to keep upper and lower plier jaws 51a-b open to allow the user to easily grip objects. Spring clip 59 is optional and can be omitted as it is in many prior art pliers. Spring-loaded ball bearings 28 and 38 prevent double-ended screwdriver assemblies 20 and 30 respectively from sliding out of lower receiver 41b and upper receiver 41a respectively during use. Needle nose pliers gripping surfaces 53, scalloped pliers gripping surfaces 54, wire cutting edges 55 and crimper pliers gripping surfaces 56 can be used in a similar manor as similar prior art tools. Many different types of plier heads can be used instead of the multi-function upper and lower plier jaws 51a and 51b disclosed here. Various other tools, such as wire strippers, hole punches, grommet installers and many more, can be added to different types of pliers to provide other combination functions for the user.

4) Pencil Use (FIG. 4b)

In FIG. 4B, pencil 29 is shown inserted into socket cavity 24a. Spring loading within retaining cuff 29c can hold pencil 29 within socket cavity 24a so that it does not fall out during normal use. Double-ended screwdriver assembly 20a can be removed from drive-pliers 50 and used in its entirety as a elongated pencil, or pencil 29 can be removed from central housing 24 and used by itself. By having alternate tools like pencil 29, specialty screwdriver bits, and other specialized tools, the user can select from these tools depending on what they most commonly use their drive-pliers for. Thus, the user, if given a choice, can outfit their drive-pliers 50 with whatever screwdriver bits, socket driver bits and other tools they like to use, making the driver-pliers customizable for each user. Thus, with hundreds of possible bit and small tool choices are available in the prior art, the user to populate their drive-pliers with the tools that "they" most often use.

RAMIFICATIONS, and SCOPE

The disclosed dual screwdriver assembly pliers multitool (drive-pliers) provide a full set of rotary fastener tools in a convenient collapsible pliers format. The drive-pliers is able to collapse to a very compact state because the screwdriver assemblies can be placed in a stowed position and also extended for used as handles for the pliers. This double duty use of the drive-pliers components reduces the overall weight of the collection of tools, which can be much less than the same collection of tool found separately.

Although the above description of the invention contains many specifications, these should not be viewed as limiting the scope of the invention. Instead, the above description should be considered illustrations of some of the presently preferred embodiments of this invention. For example, it should be obvious from the above discussion that double-ended screwdriver assemblies 20 and 30 can be added to nearly any kind or shape of pliers or similarly shaped hand tool (e.g., needle nose pliers, lineman's pliers, cutting pliers, cutting nippers pliers, combination pliers, ark joint pliers, slip joint pliers, water pump pliers, locking pliers, compound pliers, ear clamp installation tools, diagonal cutting pliers, Channel lock pliers, curved needle nose pliers, bent needle nose pliers, rounded nose pliers, crimping pliers, alligator pliers, electrician's pliers (with added insulation), bolt end cutting nippers, raptor pliers, high-leverage pliers, fencing pliers (includes hammer head), carpenter's pliers, long reach pliers, locking pliers (i.e., Vise Grip®), duck-bill pliers, retaining ring pliers, wire stripping pliers, crimper stripper pliers, strapping cutters, scissors, tin snips, leather punch pliers, grommet pliers, rivet nut tool, threaded sett pliers and etc.). Further, nearly any screwdriver bit style or driver socket style can fit into the general format shown for double-ended screwdriver assemblies 20 and 30. Further, the style of screwdriver assembly can very depending on the intended use. For example, if a large number of different screwdriver bits and/or tools are needed each end of the two screwdriver assemblies can comprise s double ended insert (double-ended inner housings) to allow four bit sizes on each end of the screwdriver assemblies for a total of sixteen bit sizes or tools, not including the various sizes of socket drivers that these assemblies and inserts can provide. For example, one screwdriver assembly might provide socket driver sizes ⅛ inch through ⅜ inch in 1/16 inch steps (5 sizes) and the other screwdriver assembly might provide socket driver sizes 3 mm through 7 mm in 1 mm steps (5 sizes) to provide both Standard and Metric socket drivers. Of course other sizes could be chosen. Further, many other tools can be designed to fit in the socket cavities 24a-b and 34a-b and can include, but are not limited to, knifes, a small hammers, small scissors, small pry tools, flashlights, bottle openers, can openers, nail files, various fishing tools, and/or various other hand tool. Also, while the illustrated drive pliers show needle nose pliers 40 and screwdriver assemblies' upper and lower receivers 41a-b lying substantially in the same plane, the position of these components, in relationship to each other, can be modified as needed for specific needs. For example, upper and/or lower receivers 41a-b can be offset into and/or out of the plane of the page of the shown illustrations to provide various non-flat configurations of the pliers and screwdriver assemblies. Similarly, upper and lower receivers 41a-b may not be substantially inline with lower and upper plier jaws 51a-b respectively, but can be angled in or out of the page as needed.

In at least one embodiment, upper and lower receivers 41a and 41b can comprise a pivotal mount (or hinge) between it and its respective plier attachment arm 58a and 58b, such that, needle nose pliers 40 to be pivoted with respect to upper and lower receivers 41a-b (and screwdriver assemblies 30 and 20) for use as an angled pliers (angled pliers are a common type of pliers found in prior art). The pivotal mounts 58a-b can have a pivotal axis that allows upper and lower receivers 41a-b to pivot out of the plane of the page (e.g., a pivot axis along the axis of one of the mount screws 49). The pivotal mounts attachment of upper and lower receivers 41a-b to plier attachment arms 58a-b, can allow upper and lower receivers 41a-b to have a single working end and be pivoted to their stowed position instead moving their respective screwdriver assembly 30 and 20 from one end of the receivers to the other. In some embodiments the pivotal mounts between receivers 41a-b and plier attachment arms 58a-b can be spring tensioned to provide a strong restoring force to keep the receivers 41a-b inline with the plier attachment arms 58a-b. This restoring force can also be used to push against outside surfaces 57a and 57b of plier jaws 51a-b respectively and help keep plier jaws 51a and 51b closed during use of screwdriver assemblies 20 and 30. When lower receiver 41b and/or upper receiver 41a are/is pivoted up to this stowed position (i.e., upper and lower receivers 41a and 41b pivoted one-hundred eighty degrees from their position in FIG. 2) the screwdriver assemblies 30 and 20 can still attached to their working end to securing holes 47a and 47b respectively and screwdriver assemblies 30 and 20 can be in the positions shown in FIG. 2. Finally, the disclosed drive-pliers can provide nearly any combination of pliers and multiple standard screwdriver bit, specialty screwdriver bits, several socket driver sizes and other tools in a compact easily storable multi-tool.

Thus, the scope of this invention should not be limited to the above examples, but should be determined from the following claims.

I claim:

1. A hand tool, comprising:
a) a pliers assembly comprising a first and second plier jaws pivotally attached at a center hinge, wherein the first and second plier jaws define a first and second handle respectively,
b) a first and second screwdriver assembly each comprising two or more screwdriver bits;
c) a first and second receiver each comprising a front end and a rear end;
d) wherein the first receiver is securely attached to the first handle and the second receiver is securely attached to the second handle;
e) wherein the first screwdriver assembly is removably attachable to both the front end and the rear end of the first receiver, wherein the second screwdriver assembly is removably attachable to both the front end and the rear end of the second receiver, and
f) wherein the hand tool defines a stowed position where the first and/or second screwdriver assemblies are removably attached to the front end of the first and second receiver respectively.

2. The hand tool in claim 1, defines a screwdriver when the first or second screwdriver assembly is removably attached to the rear end of the first or second receiver respectively, whereby that screwdriver assembly extends away from the pliers assembly so that either of the first or second screwdriver assemblies can be used as a screwdriver while the combination of the other screwdriver assembly and the pliers assembly operates as a screwdriver handle.

3. The hand tool in claim 1, wherein when the first and second screwdriver assemblies are removably attached to the rear end of the first or second receiver respectively so that the first and second screwdriver assembly act a pair of extended handles for the pliers assembly, whereby greater leverage can be provided to the first and second plier jaws.

4. The hand tool in claim 1, wherein the first or second screwdriver assemblies comprise a removably attached pencil and/or pencil eraser.

5. The hand tool in claim 1, wherein the pliers assembly comprises a needle-nose pliers, a scalloped pliers, a wire cutter and/or a crimping pliers.

6. The hand tool in claim 1, wherein the first and/or second screwdriver assembly comprises a double-ended central housing with a first socket driver cavity at a first end and a second socket driver cavity at a second end.

7. The hand tool in claim 1, wherein the first and/or second screwdriver assembly comprises a double-ended central housing with a first socket driver cavity a first end and a second socket driver cavity on a second end, wherein the first and/or second screwdriver assembly comprises a double-ended inner housing designed to fit within the first and/or second socket driver cavities.

8. A hand tool, comprising:
a) a pliers assembly comprising a first and second plier jaws pivotally attached at a center hinge, wherein the first and second plier jaws define a first and second receiver respectively,
b) a first and second screwdriver assembly each comprising two or more screwdriver bits, wherein the first and second receivers each comprising a front end and a rear end;
c) a holding means defined on the front ends and rear ends both the first and second receivers for removable attachment of the first and second screwdriver assemblies respectively, and
d) wherein the hand tool defines a stowed position where the first and/or second screwdriver assemblies are removably attached to the front end of the first and second receiver respectively.

9. The hand tool in claim 8, wherein the first and/or second screwdriver assembly comprises a double-ended central housing with a first socket driver cavity at a first end and a second socket driver cavity at a second end.

10. The hand tool in claim 8, defines a screwdriver when the first or second screwdriver assembly is removably attached to the rear end of the first or second receiver respectively, whereby that screwdriver assembly is extended away from the pliers assembly so that it can be used as a screwdriver while the other screwdriver assembly and the pliers assembly combine for use as a screwdriver handle.

11. The hand tool in claim 8, wherein when the first and second screwdriver assemblies are removably attached to the rear end of the first or second receiver respectively so that the first and second screwdriver assembly act a pair of extended handles for the pliers assembly, whereby greater leverage can be provided to the first and second plier jaws.

12. The hand tool in claim 8, wherein the first and second screwdriver assembly each comprising four or more screwdriver bit ends.

\* \* \* \* \*